United States Patent
Legare et al.

(10) Patent No.: US 6,952,590 B2
(45) Date of Patent: Oct. 4, 2005

(54) APPARATUS AND METHOD FOR A MULTI-CHANNEL, MULTI-USER WIRELESS INTERCOM

(75) Inventors: David J. Legare, Rome, NY (US); F. Robert Falbo, Rome, NY (US); Paul E. Sargent, Rome, NY (US); Timothy A. Baker, Utica, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 476 days.

(21) Appl. No.: 10/139,571

(22) Filed: May 6, 2002

(65) Prior Publication Data

US 2003/0207694 A1 Nov. 6, 2003

(51) Int. Cl.[7] .............................. H04B 7/00; H04Q 7/20
(52) U.S. Cl. ...................... 455/511; 455/511; 455/515; 455/518; 455/421.1; 455/455; 455/63.3; 455/71
(58) Field of Search .................................. 455/511, 515, 455/516, 520, 521, 422.1, 426, 426.1, 428, 455, 464, 71, 518, 519, 414, 63.3

(56) References Cited

U.S. PATENT DOCUMENTS

| | | | | |
|---|---|---|---|---|
| 5,369,783 A | * | 11/1994 | Childress et al. | .............. 455/17 |
| 5,493,695 A | * | 2/1996 | Aitkenhead et al. | ........ 455/509 |
| 5,983,072 A | * | 11/1999 | Schroderus | ................ 455/11.1 |
| 6,233,228 B1 | * | 5/2001 | Collar et al. | ................ 370/315 |
| 6,584,324 B1 | * | 6/2003 | Vivekanandan | ............. 455/519 |

* cited by examiner

Primary Examiner—Nick Corsaro
Assistant Examiner—Shaima Q. Aminzay
(74) Attorney, Agent, or Firm—Joseph A. Mancini

(57) ABSTRACT

Method and apparatus for providing a multi-channel, multi-user wireless intercom, comprising a plurality of multi-channel wireless transceiver radios configured to form a radio unit. Each user in a group of users employs a radio unit to communicate with other users in the group. Users may selectively communicate with another user or broadcast simultaneously to all users in the group. Additionally, subnets between users may be formed where communications take place among a number of selected users comprising less than the entire group of users. Receive and transmit audio combiners are employed such that users can hear communications traffic on one or more channels and transmit on one or more channels, simultaneously.

11 Claims, 3 Drawing Sheets

APPARATUS AND METHOD FOR A MULTI-CHANNEL, MULTI-USER WIRELESS INTERCOM

STATEMENT OF GOVERNMENT INTEREST

The invention described herein may be manufactured and used by or for the Government of the United States for governmental purposes without the payment of any royalty thereon.

BACKGROUND OF THE INVENTION

Hand-held radios have been in use for many years to provide communications between small groups of two or more individuals working on a common task. Examples of this are evident in everyday events such as police and fire operations, search and rescue, etc. The Air Force and Army likewise conduct similar activities. Some of these involve flightline operations and comprise hardwired connections between users. However, the communications are functionally the same. A common element of all the above is that any given user is listening to only a single radio (or hardwired) channel at any given time. Furthermore, there may be a number of user-selectable channels over which any two or more users may choose to communicate at a given time. This is generally necessary where there are more than two groups to allow sufficient opportunity for all of the necessary communications between the various groups' members to take place. A major deficiency with this configuration, however, is that it does not allow members of one group to be addressed by members of another group at the same time, either individually or collectively. For example, in an emergency situation it may be necessary for all of the members of a group to be alerted via some type of warning. In many instances this could be a situation in which the failure of an immediate response by one or more of the group members could lead to disaster. It would be desirable to enable any of the members of a given group (or external information source) to communicate via a broadcast to all of the other group members simultaneously and independent of any other communications in which they are engaged. It would likewise be desirable to enable simultaneous monitoring of multiple channels by any member of the group.

OBJECTS AND SUMMARY OF THE INVENTION

The present invention provides a method and apparatus for a multi-channel, multi-user wireless intercom.

One object of the present invention is to provide a method and apparatus for a wireless intercom where a user can simultaneously communicate with one or more other users.

Another object of the present invention is to provide a method and apparatus for creating a wireless intercom subnet among one or more wireless intercom users so as to include some users but exclude other users from participating in the communication.

Briefly stated, the present invention provides a method and apparatus for providing a multi-channel, multi-user wireless intercom, comprising a plurality of multi-channel wireless transceiver radios configured to form a radio unit. Each user in a group of users employs a radio unit to communicate with other users in the group. Users may selectively communicate with another user or broadcast simultaneously to all users in the group. Additionally, subnets between users may be formed where communications take place among a number of selected users comprising less than the entire group of users. Receive and transmit audio combiners are employed such that users can hear communications traffic on one or more channels and transmit on one or more channels, simultaneously.

According to a feature of the invention, apparatus for providing a multi-channel, multi-user wireless intercom, comprises at least one wireless transmitting device for each user; at least one wireless receiving device for each user; a means, cooperating with the at least one wireless transmitting device, for providing at least one frequency-tunable transmit channel for each user; a means, cooperating with the at least one wireless receiving device, for providing at least two frequency-tunable receive channels for each user; a microphone for each user; a headphone for each user; a means for connecting the means for at least two frequency-tunable receive channels to the headphone; a means for connecting the means for the at least one frequency-tunable transmit channel to the microphone, wherein any user may simultaneously transmit on any of the at least one transmit channel and wherein any user may simultaneously receive on any of the at least two receive channels.

According to another feature of the invention, method for providing a multi-channel, multi-user wireless intercom, comprises the steps of providing a wireless transmit and receive medium for each user; providing at least one transmit channel and at least two receive channels over the wireless transmit and receive medium, respectively, for each user, wherein at least one transmit and at least two receive channels being independently frequency-tunable; wherein any user may simultaneously transmit on any of the at least one transmit channel, and wherein any user may simultaneously receive on any of the at least two receive channels; combining the outputs of the at least two receive channels so that they may be heard through a common headphone by the user; combining the inputs to each of the at least one transmit channel so that the user's voice may be input into each of the at least one transmit channel from a common microphone; and configuring one of the at least two receive channels so as to indicate to the user that the transmit channel over which the user desires to communicate is already in use by another user, where the step of configuring further comprising the step of automatically tuning one of the at least two receive channels to the same frequency as the transmit channel over which the user desires to communicate.

These and may other objects, features and advantages of the present invention will be readily apparent to one skilled in the pertinent art from the following detailed description of a preferred embodiment of the invention and the related figures, in which like reference numerals designate the same elements.

DETAILED DESCRIPTION OF THE PREFERRED EMBODIMENT

The present invention provides an apparatus and method for a novel radio design configuration which allows for a marked improvement over the prior art hardwired multi-channel communications systems in common use by the military for airfield crews, etc. with a wireless system as provided by the present invention yielding greater functionality, including simultaneous monitoring of multiple channels by any user or users. The wireless feature of the present invention provides greater range and mobility than the prior art due to the lack of tethers between the users and the hub station to which they are tied. The basic functionality of the prior art wired system is as follows: Each user (typically one of a team of four or five) wears a headset that is connected via a long cable to a switching node (hub station). Each user can establish a point-to-point connection to any other user via a manual switch. Each user can also switch to a common intercom channel that allows him/her to transmit simultaneously to all of the other users.

Figure 1:
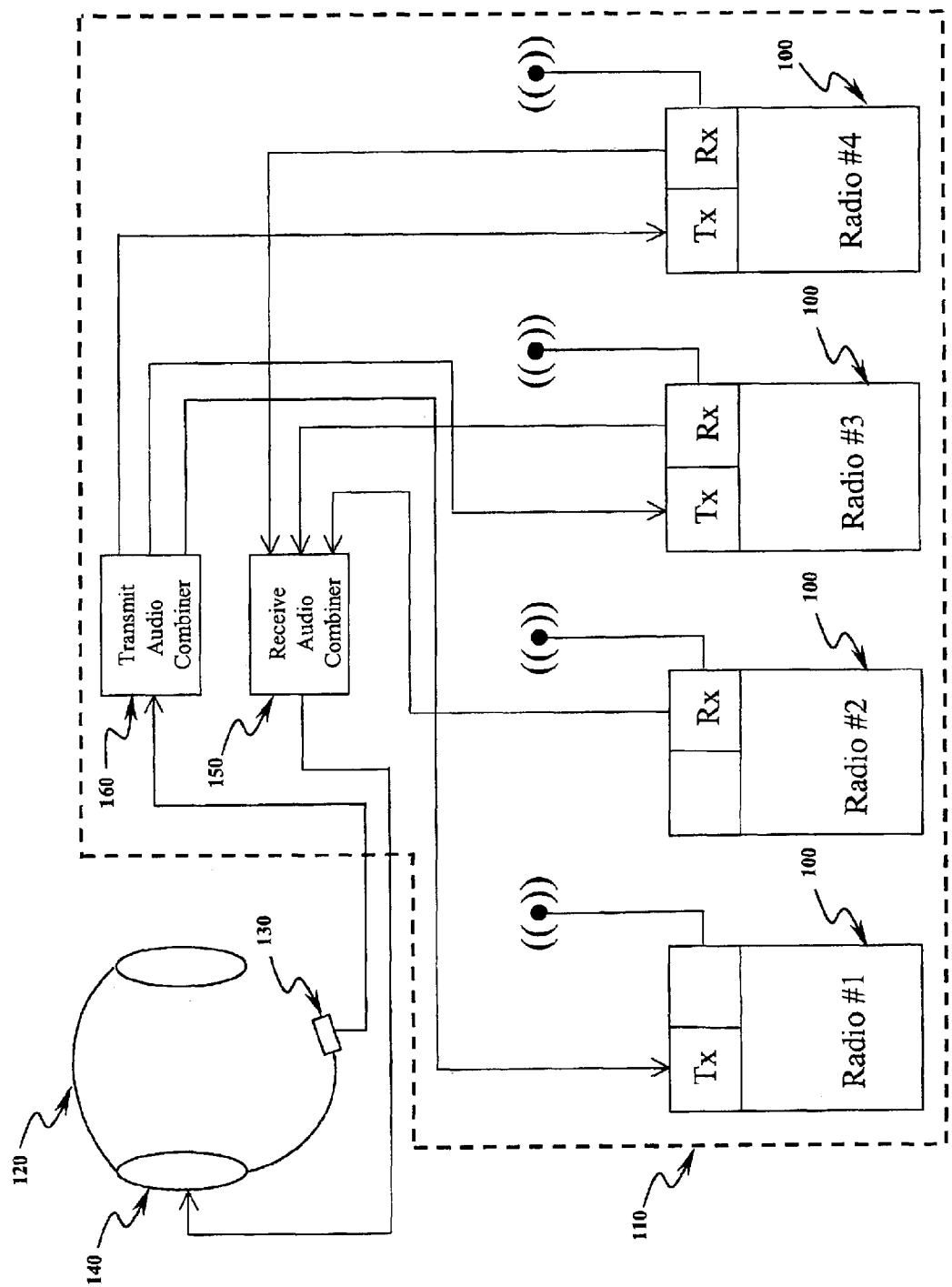
FIG. 1 depicts a block diagram of the present invention.

Referring to FIG. 1, the present invention may be comprised of these functional components. Radios 100 may comprise off-the shelf, push-to-talk, hand-held radios. It will be apparent to one skilled in this art how a custom radio design can be produced using basic transmit and receive component hardware available from any known hand-held/ personal radio manufacturer. The radio system of the present invention will essentially consist of a minimum of two receive channels and one transmit channel for each user in the communication group. That is, each user will have a portable radio unit 110 comprising a single small box with a headset 120 connected thereto. This radio unit 110 will be attached to his person and it will have a minimum of one transmit and two independent receive channels. For each user, one of the receive channels will be permanently set and will be identified with that user (ie. channel 3 will be user 3). The other receive channel will be set to a permanent common channel. The common intercom channel will allow any given user to simultaneously transmit to all of the other users. The maximum number of users that can exist within a given group is limited to the total number of available channels minus the common intercom channel (ie. 14 available channels implies 2 to 13 users). The user's interface to each personal radio unit 110 comprises a microphone 130 (for transmit) and headphones 140 for receive. Typically, this can be implemented as a standard headset 120 with an attached microphone for hands-free operation. A unique feature of the present invention is that the headset 120 would be configured so that the transmit channel is connected to the microphone 130 while the two receive channels are simultaneously connected to the headphones 140. The two receive channels would be combined via various means known to anyone skilled in the art to allow both receive channels to be heard either separately or together without any manual intervention by the user. It should be noted that the transmit channel on each radio unit 110 is manually selectable by the user, enabling transmission on any of the available channels; that is any of the channels assigned or identified with any one of the other users, or the common intercom channel. For example, user 4 can select to transmit on channel 3 to talk one-on-one with user 3 and then select the common intercom channel to simultaneously transmit a message to all of the users in the group. Note that the intercom transmission would be heard by all users, even if they are presently involved in one-on-one conversations with other users.

A one-on-one conversation between two users would be established as follows: User 2 desires to initiate a connection with user 5, therefore user 2 selects channel 5 on his radio unit 110 to transmit. Using some standard protocol, user 2 gets the attention of user 5 and tells him that they need to converse. User 5 then selects channel 2 on his radio unit 110 to transmit. Now user 2 and user 5 can communicate in full-duplex mode, that is, without the need for push-to-talk. If some other user transmits over the intercom channel during their conversation, both user 2 and user 5 will hear it. It should also be noted that user 3, for example, may want to talk to user 5 while user 5 is still talking to user 2. One way to avoid having user 3 unexpectedly break into the conversation would be to have an additional (third) receive function (not shown) on the radio unit 110 (for a total of 3 separate receive channels) which is tied to the transmit channel select switch (not shown) so that this third receive function is always set to the same frequency as the selected transmit channel. The third receive function would provide a binary indicator (not shown) such as an LED light that is either "ON" or "OFF" which tells user 3 that someone is already transmitting to user 5, thereby giving him the option of waiting until the connection between user 2 and user 5 is broken. This third receiver would only function as an indicator and thus it would not be used to produce an audio output or to carry voice information. It can be seen that this third receiver indication function would be desirable, but not necessary to implement the essential features of the present invention.

Still referring to FIG. 1, the present invention may be practiced using four small push-to-talk multi-channel hand-held, off-the-shelf radios 100 (packaged together into a compact belt-mounted box, for example) in which Radio 1 is used only in the transmit mode, and Radio 2 only in the receive mode. Note also that all of the receive audio signals are routed into a receive audio combiner 150 and all transmit audio signals likewise routed into a transmit audio combiner 160. Employing receive and transmit audio combiners 150, 160 allows for all of the receive outputs from radios 100 to be connected to the headphones 140 and for all of the transmit inputs into the radios to be connected to the microphone 130.

It should be noted that while it is possible for all of the radios' 100 receive outputs to be heard either individually or simultaneously on the headphones 140, only one of the radios' 100 transmit inputs will be allowed an electrical connection to the microphone at any given time. For this reason, the present invention will be provided with a switch or series of switches (not shown), preferably with an LED position indicator, which allow only one of the following transmission modes to be selected at any given time: (1.) transmission on Common Intercom Channel "Int"; (2.) transmission on Intercom Subnet Channels "x,y"; or (3.) transmission on one of the User Identifier Channels "1", "2", "3", "4", or "5". These switches would enable only one of Radio 1, Radio 3, or Radio 4 to be in a transmit mode at any given time. Once enabled, the transmission from that radio would occur after the push-to-talk button is activated through various means including continuous on, push-to-talk, or voice-activated push-to-talk. It is a preferred mode that a common, singular "talk button" (not shown) be configured so as to activate all of the radios 100 at the same time. Still, only that one of Radio 1, Radio 3, or Radio 4 which has been previously enabled for transmit mode will actually transmit. Even though it is possible for the user to hear any of the receive outputs (i.e., from any or all of Radio 2, Radio 3, or Radio 4) at the same time, there are times when it may be desirable to block out the receive audio from either Radio 2 or Radio 3 when that user is being transmitted to on his user identifier channel or while on one of the intercom subnet channels (i.e. user 1 may want to block out communications between user 2, user 3, and user 4 on channel x while he is in a one-on-one conversation with user 5). This can be accomplished by providing separate on/off switches, (not shown) preferably with indicator lights, (also not shown) to either enable or disable the receive output on Radio 2 or Radio 3. Thus, either one or both of the receive outputs from Radio 2 and Radio 3 can be enabled or disabled. However, in practice, Radio 2 should be on as much of the time as possible to allow the user to be contacted directly via his "identifier channel" (i.e. channel 3). Therefore, in order for the user to establish a connection with another individual user (i.e. using channels 1, 2, 3, 4, 5) or with multiple users over one of the intercom subnet channels (i.e. channels x, y) both transmit and receive functions for either of Radio 1, Radio 2, Radio 3 or for Radio 4 must be enabled in accordance with the communication mode desired (i.e. one-on-one or intercom subnet).

So as to insure that the present invention is as user-friendly as possible, the following "pre-setting" of channel selections and restrictions should be made before deployment: 1) Radio 1's manual switch (not shown) which allows for the selection of any one of the user identifier channels 1, 2, 3, 4 or 5 at any time, should be blocked so that the intercom channels (Int, x, y) cannot be selected; 2) Radio 2 is the user's fixed "identifier channel" receiver and should be permanently pre-set (so that the user doesn't have ready access to the channel selector) to an assigned user channel (ie. channel 3). 3) Radio 3's manual switch (not shown) should be restricted so as to allow the user to select only one of the intercom subnet channels (ie. x, y); 4) Radio 4 should be permanently pre-set to the common intercom channel (Int) with the channel selector (not shown) not accessible to the user.

Figure 2:
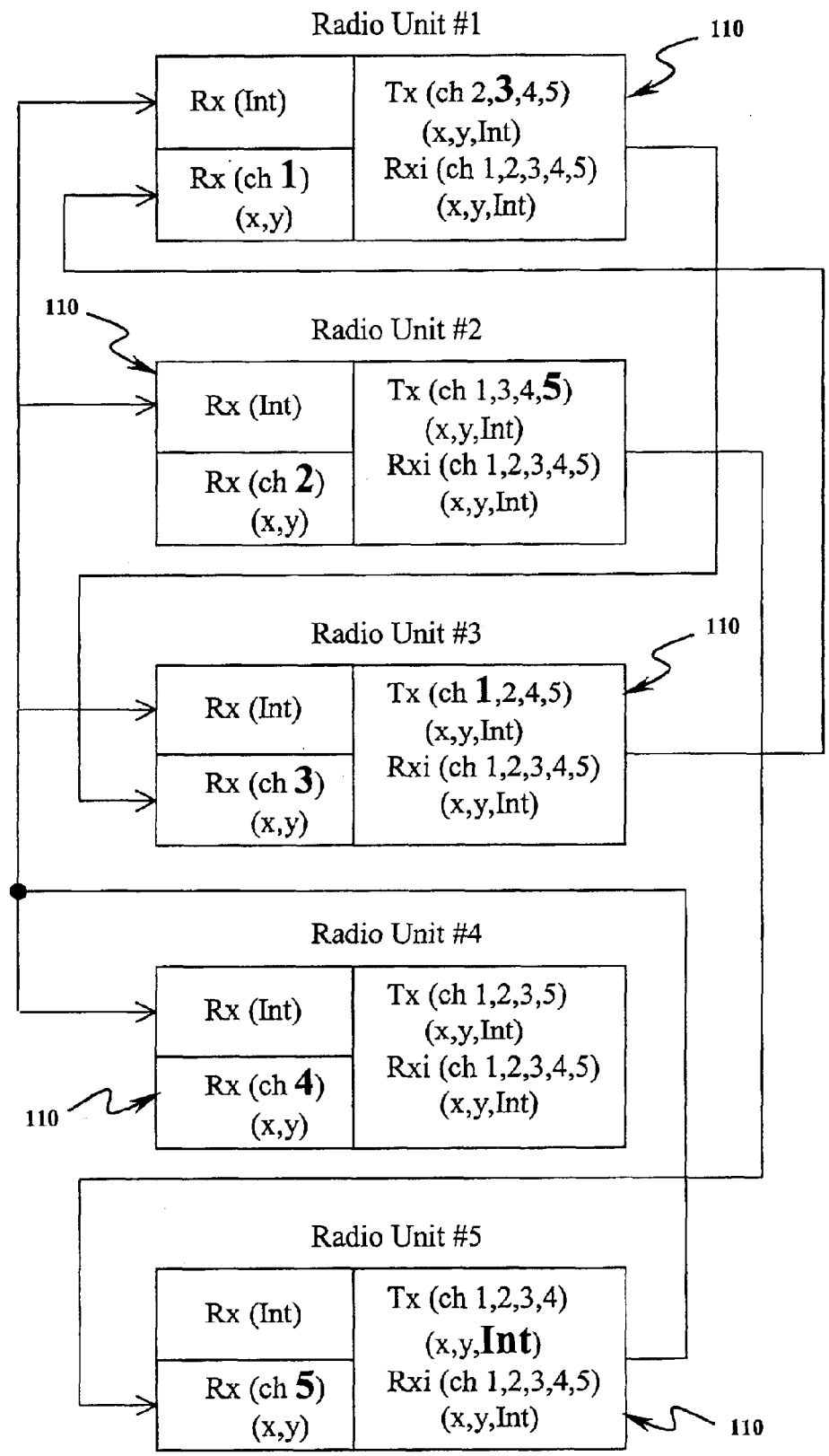
FIG. 2 depicts the present invention simultaneously performing point-to-point and broadcast communications.

Referring to FIG. 2, a typical use of the present invention is depicted among a group of five users employing radio units 110 with five user assigned channels, two intercom subnet channels and a common intercom channel. The specific configuration of radio units 110 here, is further defined over that shown in FIG. 1. Here, each radio unit 110 possesses two separate audio receive channels, one dedicated solely to the common intercom channel (Int), and the other switchable only between a "permanently set" user identifier channel (1, 2, 3, 4, or 5) and one of the intercom subnet channels (x, y). Radio unit 110 further possesses a single transmitter which is user selectable over all of the user indentifier channels (1, 2, 3, 4, 5), the intercom subnet channels (x,y) and the common intercom channel (Int). The transmitter portion of radio unit 110 also possesses a built-in receive function which is automatically switched to the same channel as the transmitter, having no audio output capability, and thus serving only as an indicator to the user of whether or not the channel on which he has decided to transmit (via switching the transmit channel selector) is currently busy.

Still referring to FIG. 2, point-to-point session has been established between users 1 and 3 while user 5 is broadcasting to all the other users (user 1, user 2, user 3, and user 4) over the common intercom channel (Int). It can also be seen that user 2 is transmitting to user 5 (over channel 5) while user 5 is transmitting on the common intercom channel (Int) to user 1, user 2, user 3 and user 4. This connectivity is representative of a situation in which a group leader (i.e. user 5 in this instance) talks collectively to subordinate group members (user 1, user 2, user 3, and user 4) while they individually report back to user 5 by transmitting on channel 5. It should be noted that while the conversation between user 1 and user 3 can take place in full-duplex mode, transmission over the intercom channels (Int, x, y) should be in simplex mode (push-to-talk, or voice-activated push-to-talk). As such, a means should be provided (as in the case of a standard off-the-shelf push-to-talk radio) to cut off the receive signal of the transmitting user's radio system while he is transmitting on the intercom channels (i.e. Int,x,y) to prevent self-interference (hearing his own transmission).

Also note that the optional receive indicator function "Rxi" is also shown as part of the transmit section of the radio unit 110. This serves the purpose described earlier wherein it serves as a channel-busy indicator to a user wishing to transmit on any of the other user-assigned channels or the intercom channels, thus giving him the opportunity to wait until the channel is clear.

Figure 3:
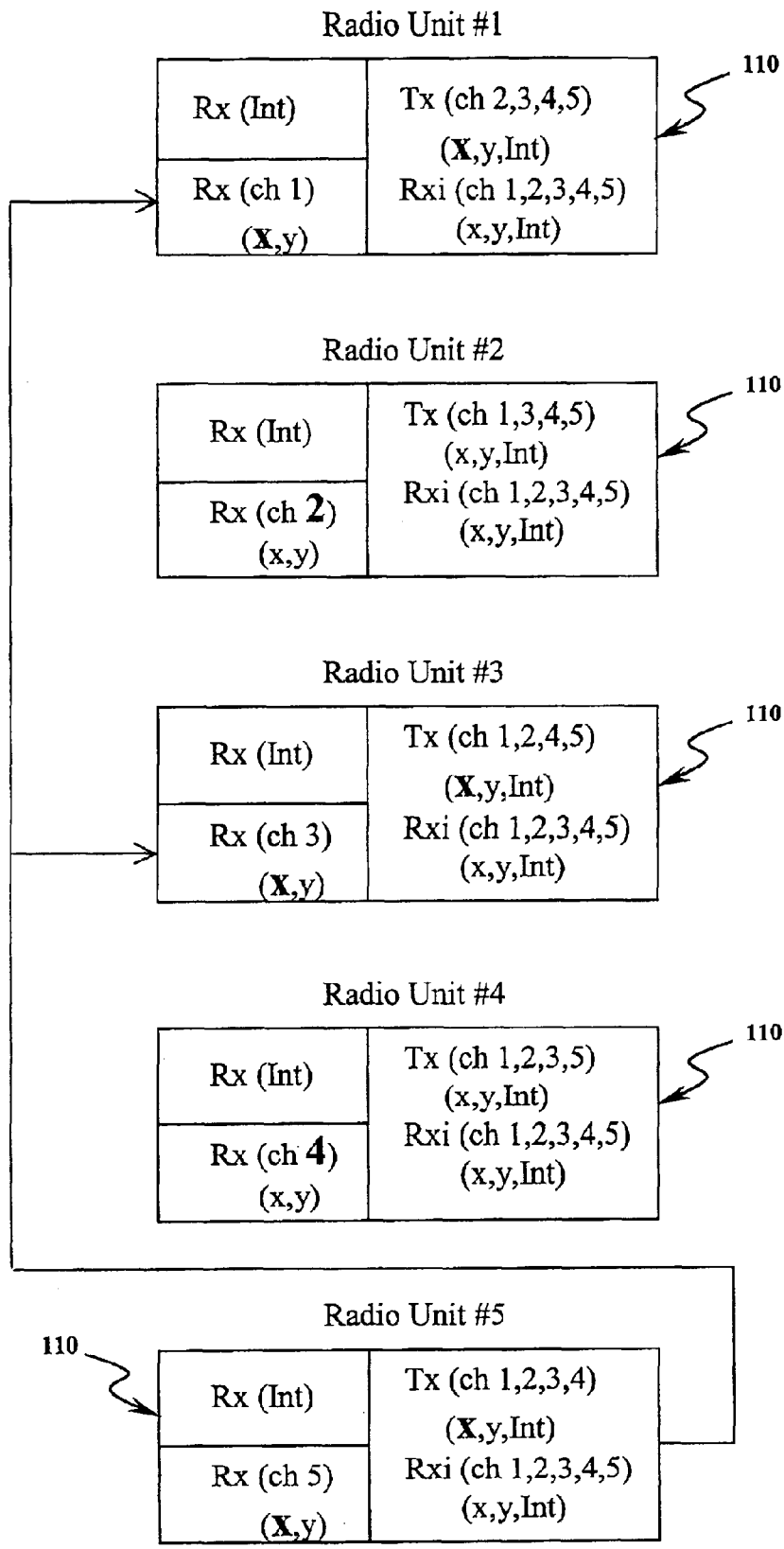
FIG. 3 depicts the present invention performing an intercom subnet communication.

Referring to FIG. 3, an intercom subnet channel session is shown in which user 1, user 3, and user 5 are participating in the session using their respective radio units 110, with user 5 currently transmitting.

Referring now to FIG. 2 and FIG. 3, concurrently, it may be desirable in some situations that the present invention be configured to allow an intercom function to be established between a subset of the group. User 4, for example, may decide to set up a conversation between himself and user 2 and user 3 over a separate intercom channel. This could be accomplished by first allowing the users' "permanently set" (identifier) receive channel to be temporarily switchable to one or more additional intercom subnet channels (x, y, z . . . ). In most cases, however, it is envisioned that one or two of these subnet channels would be sufficient. Note that these additional subnet channels cannot also be used as any one of the "permanently set" user receive channels and that while temporarily switched to one of the subnet channels a user's "permanently set" receive channel, they cannot be used by any other user in the group. Therefore, the process of using the intercom subnet function would be as follows: First, user 4 switches to transmit on the common intercom channel "Int" (which is simultaneously heard by all users) and indicates that he wants to talk to user 2 and user 3 on intercom subnet channel x. User 4, user 2 and user 3 now switch their "permanently set" receive channel to x and proceed to communicate among themselves after which they mutually terminate the intercom subnet session and all switch back to their "permanently set" receive channels. User 2, user 3, and user 4 would also set their transmit frequencies to x. In an actual product implementation of the present invention, it may be desirable to automate this switch function so that when the selected transmit frequency is changed back to anything other than one of the intercom subnet channels, (i.e. x, y) the "permanently set" receive channel is automatically set back to the default user identification channel (i.e. user 3 is set back to receive channel 3). Likewise, the receive channel should be automatically switched from the default user identification channel (i.e. channel 3) to a selected intercom subnet channel when the transmit selector is switched to that intercom subnet channel (i.e. x or y).

It should be noted that operation on an intercom subnet channel, or on the common intercom channel, should generally be done in a push-to-talk mode (or voice activated "push-to-talk" mode) to avoid self-interference. Thus, only one user should be transmitting at any given moment over either the common intercom channel or any of the intercom subnet channels. It should also be noted that the inclusion of one or more intercom subnet channels will reduce the number of "permanently set" user channels available for additional users that could otherwise be included in the group.

A number of product and user applications of the present invention are possible. These include, but are not limited to, military applications such as air crew teams, firefighting/rescue operations, and others. One application of particular interest includes communication support to aircrews and pilots on the flight line. In this case, the aircrew personnel would use the present invention described above. A modified version of the radio unit 110 would be provided for the pilot while in the cockpit of the aircraft. The present invention in such an application would be configured to interface with the standard intercom connector (not shown) on the exterior of the aircraft. This connector is normally provided to allow wired connectivity between the pilot and the flight line personnel. The radio unit 110 would be connected to this external aircraft interface to allow the pilot to wirelessly communicate with the flight line personnel via his existing cockpit intercom hardware. The pilot's communications connectivity, in this instance, becomes functionally equivalent to the other intercom network nodes used by individual flight line personnel.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. Apparatus for providing a multi-channel, multi-user wireless intercom, comprising:
    at least one wireless transmitting device for each said user;
    at least one wireless receiving device for each said user;
    means, cooperating with said at least one wireless transmitting device, for providing at least one frequency-tunable transmit channel for each said user;
    means, cooperating with said at least one wireless receiving device, for providing at least two frequency-tunable receive channels for each said user;
    a microphone for each said user;
    a headphone for each said user;
    means for connecting said means for at least two frequency-tunable receive channels to said headphone;
    means for connecting said means for at least one frequency-tunable transmit channel to said microphone;
        wherein any said user may simultaneously transmit on any of said at least one transmit channel; and
        wherein any said user may simultaneously receive on any of said at least two receive channels.

2. Apparatus as in claim 1, further comprising means for providing an additional receive channel for each said user,
    said means further comprising means for automatically tuning said additional receive channel to the same frequency as that transmit channel over which said user desires to communicate, so as to indicate to said user that transmit channel is already in use by another user.

3. Apparatus as in claim 1, wherein said at least one wireless transmitting device and said at least one wireless receiving device comprise a plurality of push-to-talk, two-way, transceiver radios.

4. Apparatus as in claim 3, wherein the receive audio outputs and the transmit audio outputs of said plurality are connected through a common receive combiner and a common transmit combiner, and then to said user's headphone and microphone, respectively.

5. Apparatus as in claim 3, further comprising means for activating said push-to-talk function of each of said plurality of push-to-talk, two-way, transceiver radios by a common, singular, push-to-talk switch.

6. Apparatus as in claim 2, wherein said means for automatically tuning further comprises:
    aural or visual indication means.

7. Method for providing a multi-channel, multi-user wireless intercom, comprising the steps of:
    providing a wireless transmit and receive medium for each user;
    providing at least one transmit channel and at least two receive channels over said wireless transmit and receive medium, respectively, for each said user,
        said at least one transmit and said at least two receive channels being independently frequency-tunable;
            wherein any said user may simultaneously transmit on any of said at least one transmit channel, and
            wherein any said user may simultaneously receive on any of said at least two receive channels;
    combining the outputs of said at least two receive channels so that they may be heard through a common headphone by said user;
    combining the inputs to each of said at least one transmit channel so that said user's voice may be input into each of said at least one transmit channel from a common microphone; and
    configuring one of said at least two receive channels so as to indicate to said user that the transmit channel over which said user desires to communicate is already in use by another user,
        said step of configuring further comprising the step of automatically tuning said one of said at least two receive channels to the same frequency as said transmit channel over which said user desires to communicate.

8. Method of claim 7, wherein said step of providing at least one transmit channel and at least two receive channels over said wireless transmit and receive medium further comprises the step of:
    configuring a plurality of push-to-talk, two-way, transceiver radios so as to activate the push-to-talk function of each of said plurality by a common, singular, push-to-talk switch.

9. Method of claim 7, wherein said step of automatically tuning further comprises:
    producing an aural or visual indication that the transmit channel over which said user desires to communicate is already in use by another user.

10. Method of claim 7, further comprising a method for providing a wireless intercom subnet, comprising the steps of:
    each subnet user setting one of said at least one transmit channel to a common intercom subnet transmit frequency; and
    each subnet user setting one of said at least two receive channels to a common intercom subnet receive frequency.

11. Method of claim 10, wherein said method for providing said wireless intercom subnet further comprises a method for automatically establishing and de-establishing said subnet, comprising the steps of:
    automatically performing said step of setting said one of said at least two receive channels to said common intercom subnet receive frequency whenever said step of setting said one of said at least one transmit channel to said common intercom subnet transmit frequency is performed; and
    automatically setting said one of said at least two receive channels back to a user default receive frequency whenever said one of said at least one transmit channel is set to any frequency other than said common intercom subnet transmit frequency.

* * * * *